(12) United States Patent
Kawano

(10) Patent No.: US 7,501,771 B2
(45) Date of Patent: Mar. 10, 2009

(54) BRIGHTNESS CONTROLLING APPARATUS, BRIGHTNESS ADJUSTING SYSTEM, COMPUTER SYSTEM, LIQUID CRYSTAL DISPLAY UNIT, BRIGHTNESS CONTROLLING METHOD, COMPUTER SOFTWARE, AND STORAGE MEDIUM

(75) Inventor: Seiichi Kawano, Kanagawa (JP)

(73) Assignee: Lenovo (Singapore) PTE Ltd., Singapore (SG)

( * ) Notice: Subject to any disclaimer, the term of this patent is extended or adjusted under 35 U.S.C. 154(b) by 396 days.

(21) Appl. No.: 10/721,207

(22) Filed: Nov. 25, 2003

(65) Prior Publication Data

US 2004/0104922 A1 Jun. 3, 2004

(51) Int. Cl.
G09G 3/36 (2006.01)
G09G 3/10 (2006.01)

(52) U.S. Cl. .................... 315/169.4; 345/147; 345/690

(58) Field of Classification Search ......... 345/410–412, 345/690–692, 102, 150, 147, 184, 204, 589, 345/625; 315/381, 383, 169.4, 174
See application file for complete search history.

(56) References Cited

U.S. PATENT DOCUMENTS

| | | | |
|---|---|---|---|
| 4,459,586 A | | 7/1984 | McVey |
| 5,042,078 A | * | 8/1991 | Oshikoshi et al. ............ 382/167 |
| 5,128,782 A | | 7/1992 | Wood |
| RE34,140 E | * | 12/1992 | Nakajima .................... 396/236 |
| 5,371,537 A | | 12/1994 | Bohan et al. |
| 5,384,862 A | | 1/1995 | Echerer et al. |
| 5,760,760 A | | 6/1998 | Helms |
| 5,761,068 A | * | 6/1998 | Nakata ........................ 700/182 |
| 5,764,209 A | * | 6/1998 | Hawthorne et al. ........... 345/87 |
| 5,786,801 A | | 7/1998 | Ichise |
| 5,850,205 A | | 12/1998 | Blouin |
| 5,886,681 A | | 3/1999 | Walsh et al. |
| 5,933,089 A | | 8/1999 | Katada |
| 5,933,130 A | * | 8/1999 | Wagner ....................... 345/690 |
| 6,043,797 A | | 3/2000 | Clifton et al. |
| 6,078,309 A | * | 6/2000 | Chen et al. ................... 345/589 |
| 6,091,397 A | * | 7/2000 | Lee ............................ 345/690 |
| 6,188,380 B1 | | 2/2001 | Kawashima et al. |
| 6,222,323 B1 | | 4/2001 | Yamashita et al. |
| 6,300,931 B1 | | 10/2001 | Someya et al. |
| 6,326,938 B1 | * | 12/2001 | Ishida et al. .................. 345/63 |
| 6,388,399 B1 | * | 5/2002 | Eckel et al. .................. 315/312 |
| 6,559,826 B1 | | 5/2003 | Mendelson et al. |
| 6,608,614 B1 | | 8/2003 | Johnson |
| 6,611,249 B1 | | 8/2003 | Evanicky et al. |
| 6,795,053 B1 | | 9/2004 | Funamoto et al. |
| 6,934,772 B2 | * | 8/2005 | Bui et al. ..................... 710/14 |
| 2004/0012620 A1 | * | 1/2004 | Buhler et al. ................ 345/716 |

* cited by examiner

*Primary Examiner*—Douglas W Owens
*Assistant Examiner*—Jimmy T Vu
(74) *Attorney, Agent, or Firm*—Sawyer Law Group, LLP.

(57) ABSTRACT

An apparatus and method for enabling screen brightness of a display unit to be adjusted automatically according to display brightness, thereby improving the visibility of the display screen to a viewing user. A brightness adjusting system including a gray scale gradation evaluator 20 for calculating the display brightness in a certain window displayed on the screen of a display unit and a display controller 30 for controlling the screen brightness of the display unit according to the display brightness in the certain window, calculated by the gray scale gradation evaluator 20, is provided for.

10 Claims, 9 Drawing Sheets

[Figure 1]
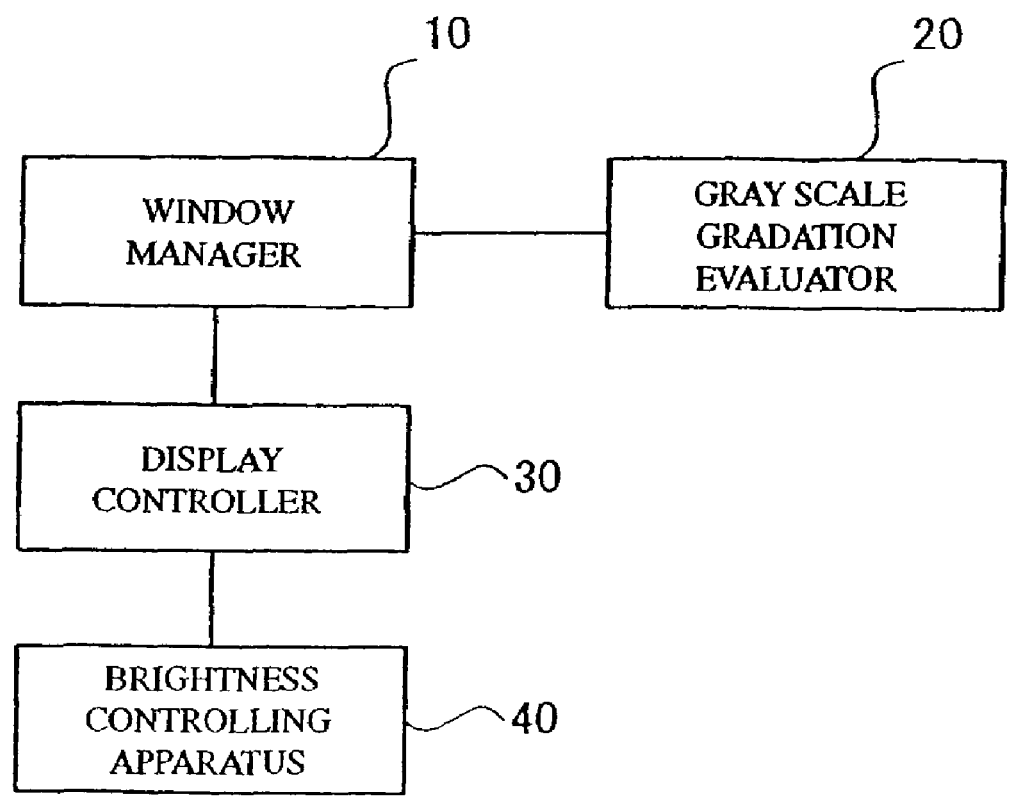

[Figure 2]
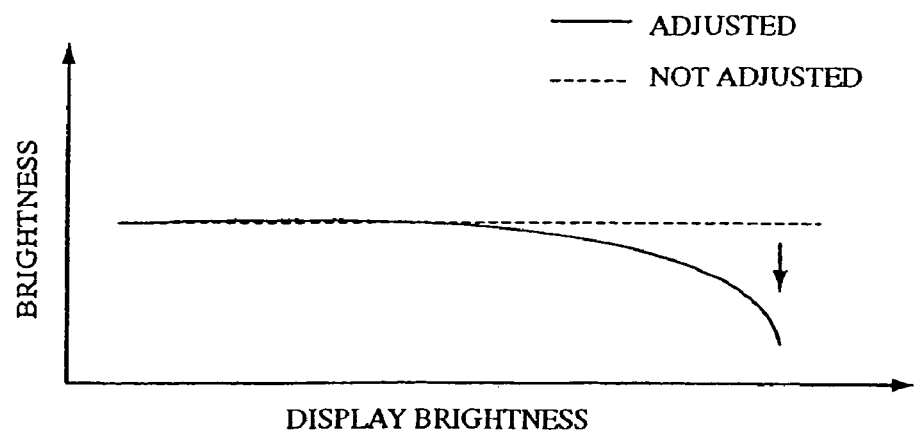
[Figure 3]
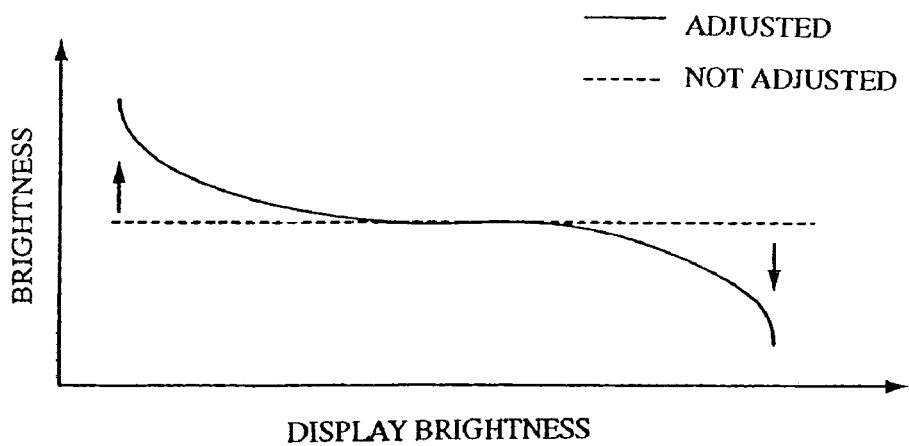

[Figure 5]
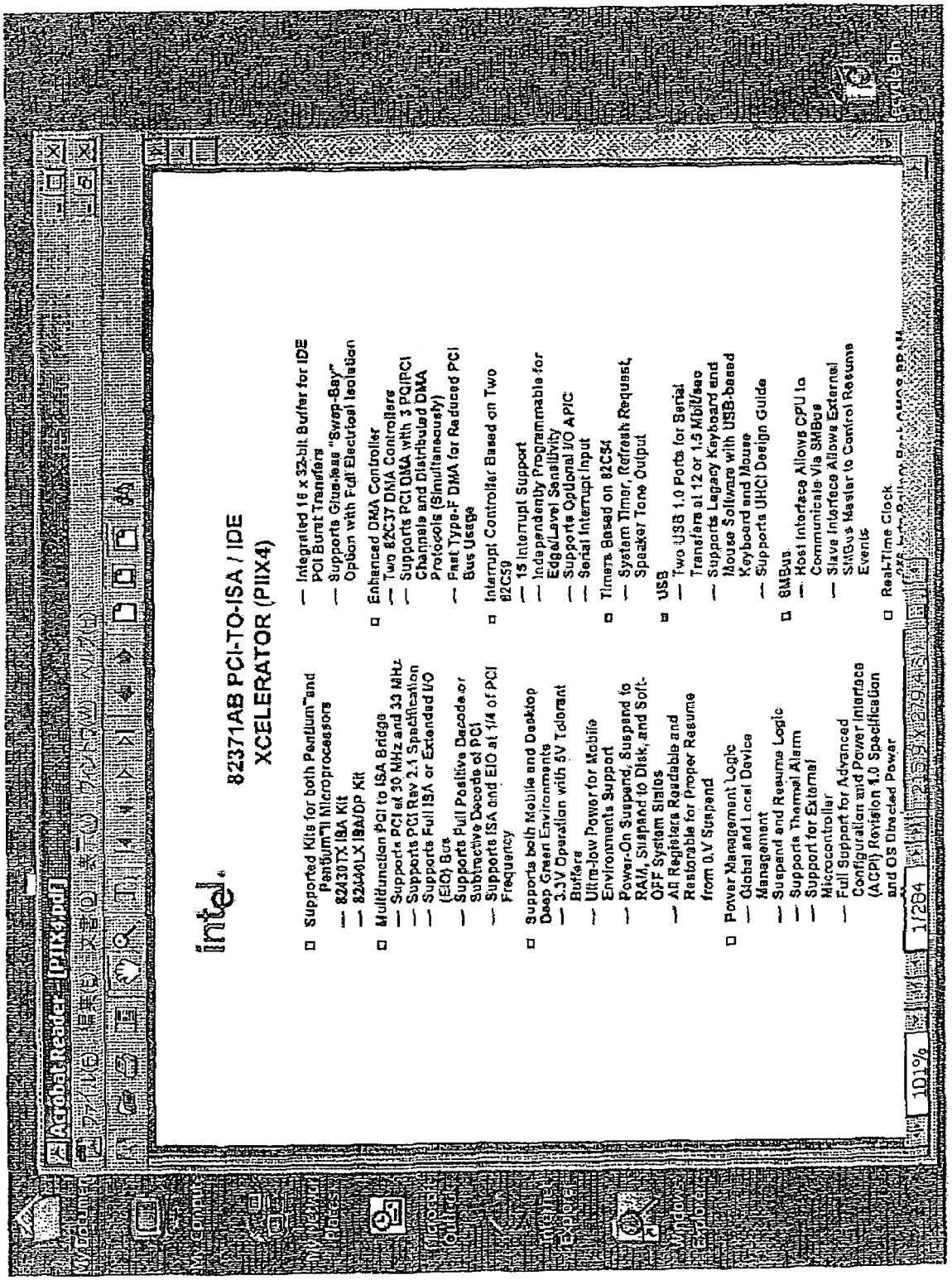

[Figure 6]
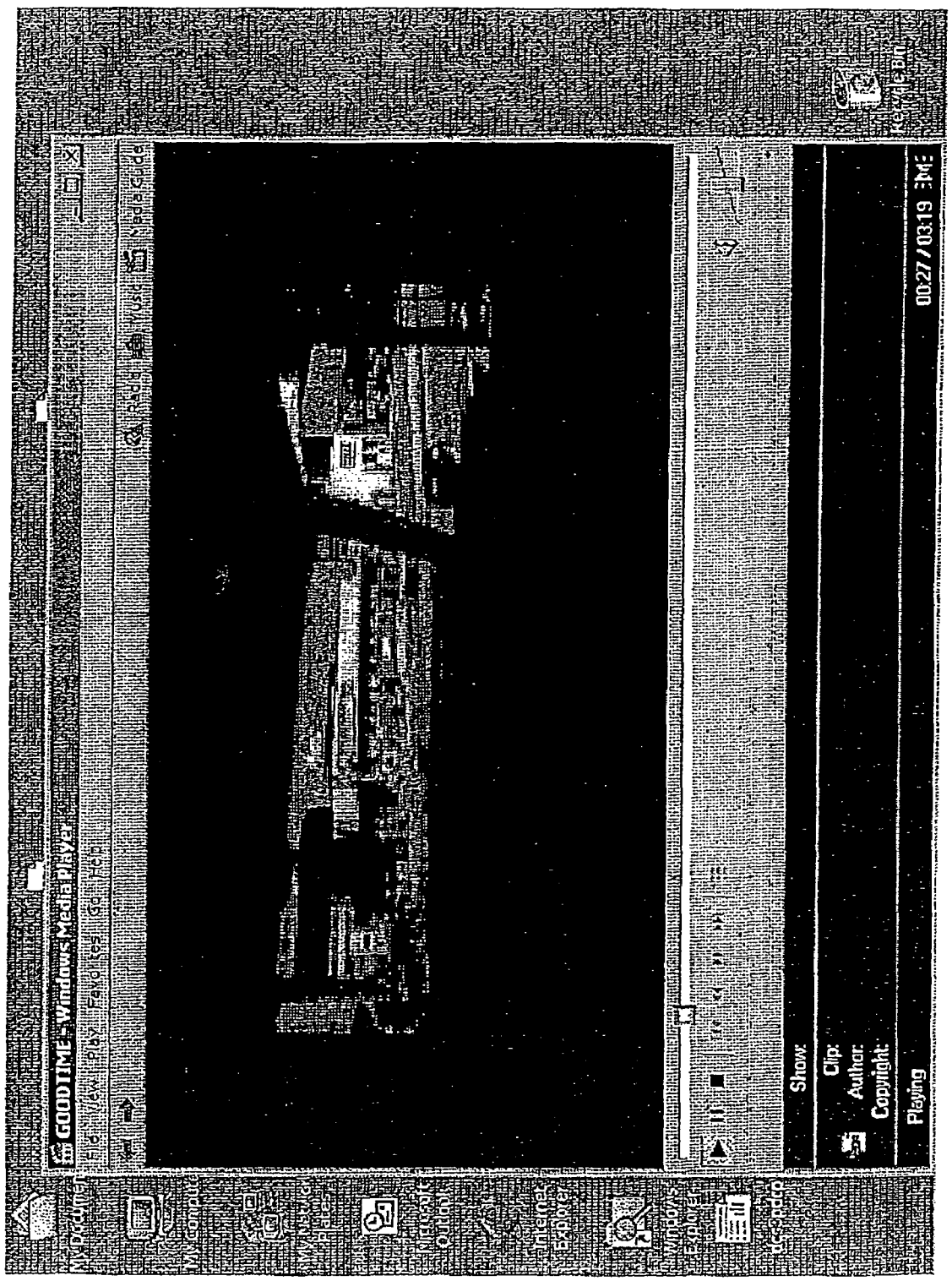

[Figure 7]
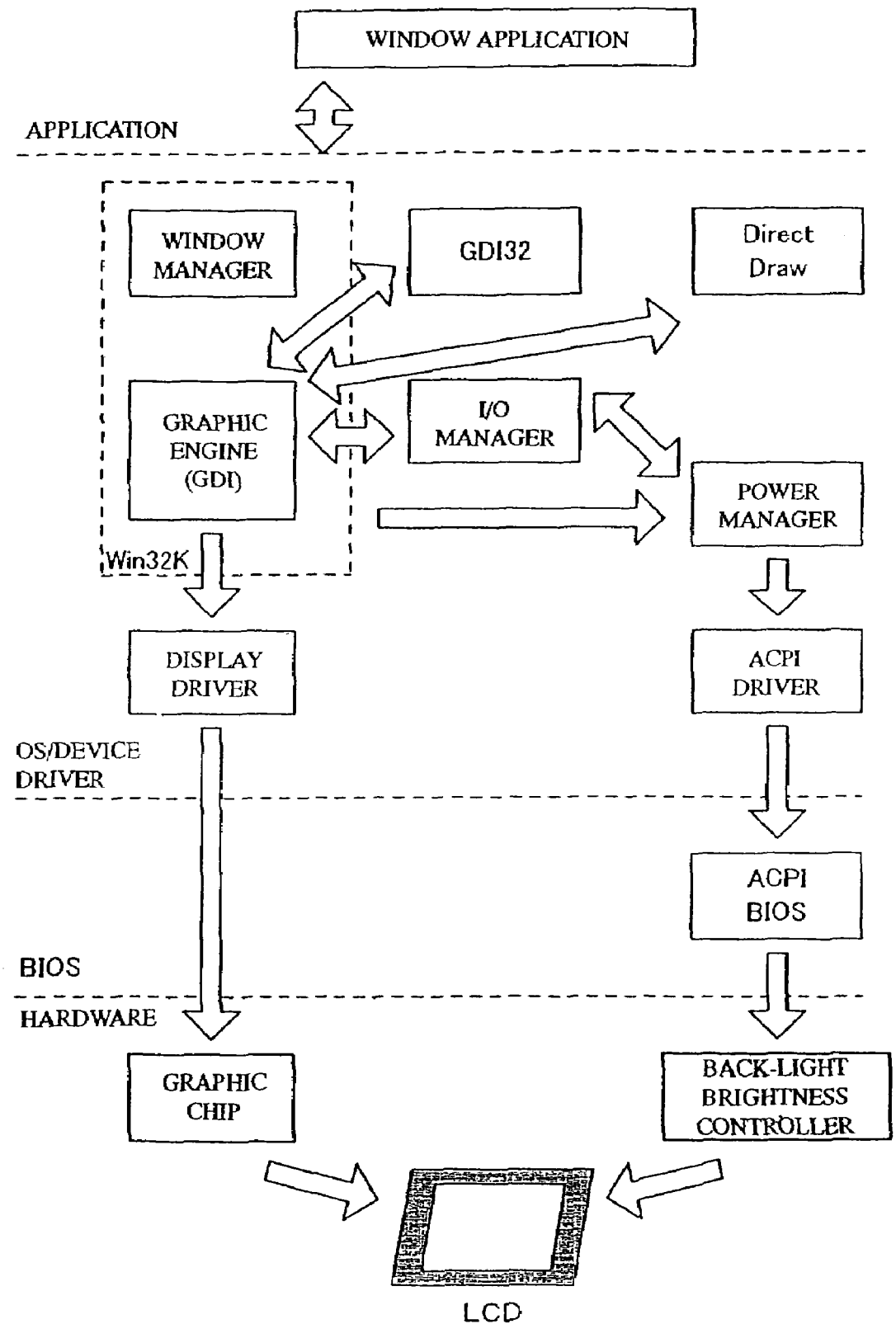

[Figure 8]
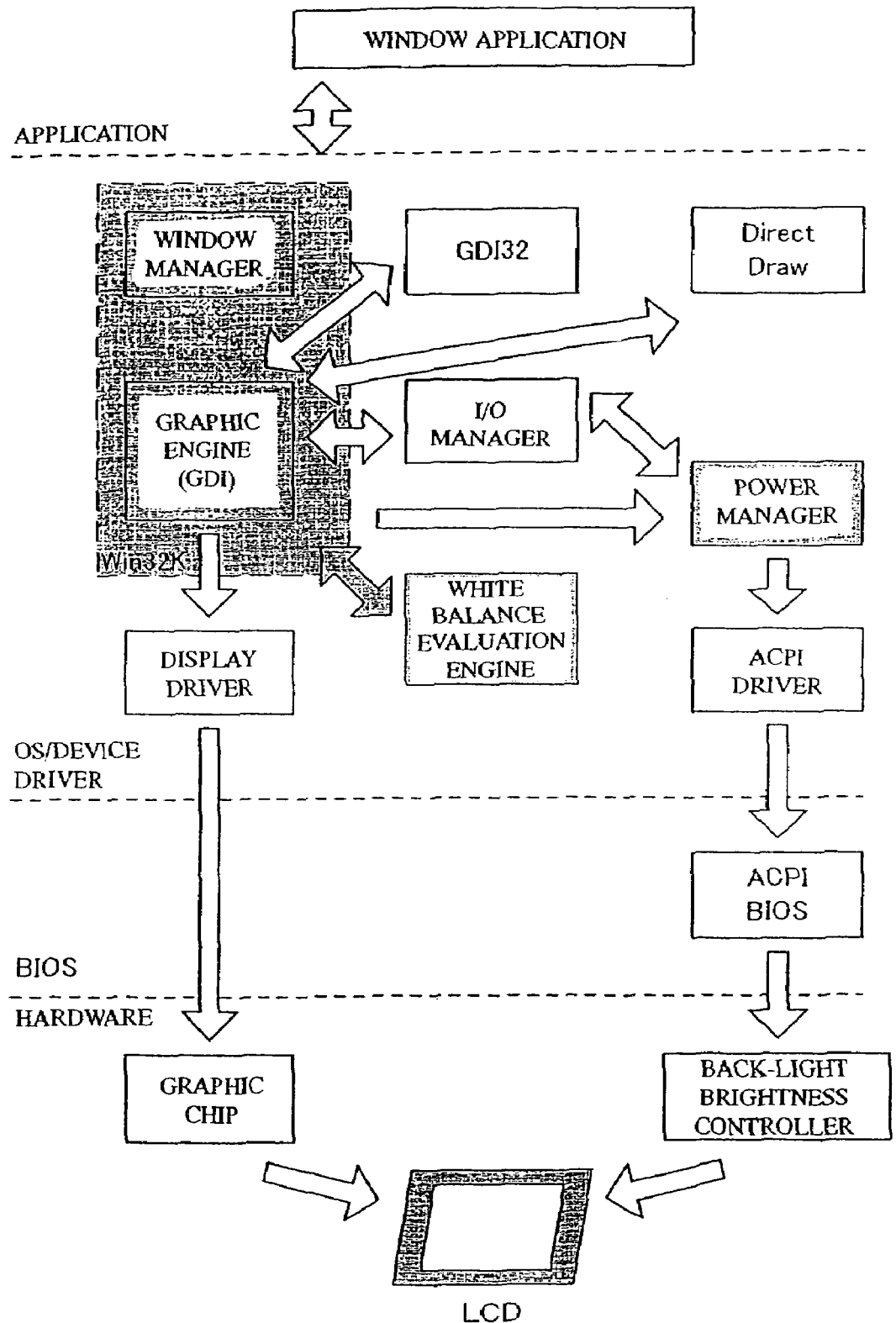

[Figure 9]
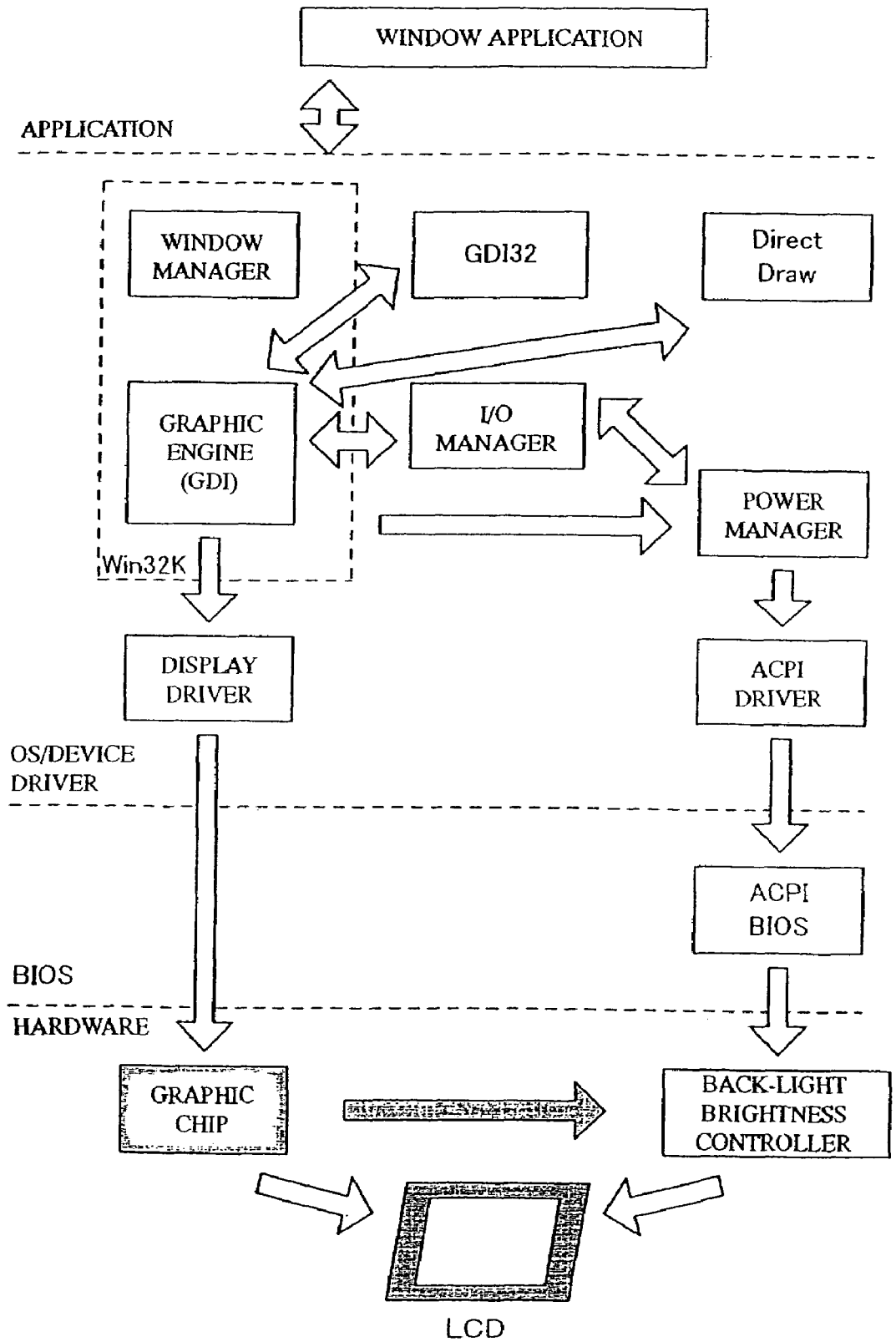

[Figure 10]
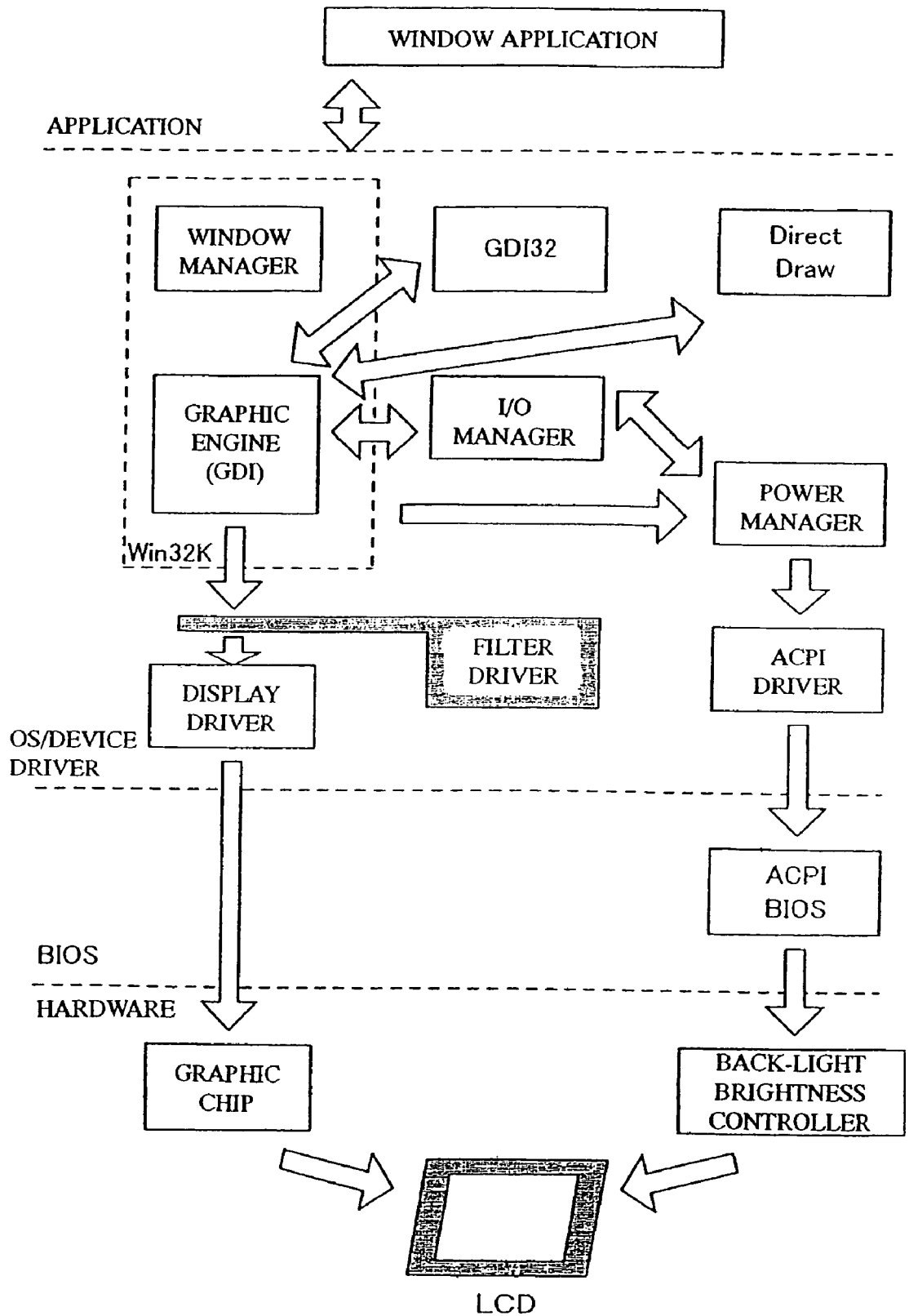

BRIGHTNESS CONTROLLING APPARATUS, BRIGHTNESS ADJUSTING SYSTEM, COMPUTER SYSTEM, LIQUID CRYSTAL DISPLAY UNIT, BRIGHTNESS CONTROLLING METHOD, COMPUTER SOFTWARE, AND STORAGE MEDIUM

BACKGROUND OF THE INVENTION

1. Field of the Invention

The present invention relates to a technique for adjusting screen brightness of a display unit and more particularly to adjusting the display brightness of a screen display

2. Description of the Related Art

The display brightness of a display unit of electronic devices (e.g., a personal computer, etc.) is often varied significantly according to the data that is to be displayed. For example, when displaying text and data entered and edited while using an application such as a word processor or spreadsheet software, the background of the image on the screen is often displayed using a bright color, such as white. As a result, the user often lowers the screen brightness so as to make it easy to read displayed data.

In other situations, images are often displayed in a plurality of colors on the screen, and the brightness of the screen is inherently less. As a result, the user increases the display brightness of the screen so as to make it easier to watch the displayed images.

More particularly, the use of a specific type of display may also affect the resulting display brightness, and hence the user's visibility of the images displayed. For instance, for an LCD (Liquid Crystal Display), the visibility is often low at a dark display. This is because the pixels of the liquid crystal do not emit light themselves, unlike a CRT display. Therefore, it is known that a user of an LCD display must often adjust the brightness to improve the user's visibility of the screen images.

Generally, the LCD is provided with a back-light so as to improve the visibility of the display. Even some of the conventional LCDs are enabled to adjust the brightness of the back-light. Certain of such battery-driven systems, such as lap-top personal computers, can change the brightness of the back-light feature automatically in addition to the manual adjustment when the power supply is switched between an AC power source and a battery so as to suppress the power consumption of the LCD.

However, these systems must be operated manually to adjust the brightness of the back-light so as to improve the display visibility.

In each of these situations, it is known that conventional display units have a function for manually changing the screen brightness. As a result, a user modifies the rightness while performing his own visual assessment of the appropriateness of the brightness. However, it is not known to modify the brightness of the screen automatically in relation to that which is displayed. It is known to be problematic where in order to improve the display brightness for a higher visibility, the user must initiate and visually adjust the screen brightness manually.

SUMMARY OF THE INVENTION

Accordingly, there is a need for a display unit of an electronic device wherein the screen brightness may be controllably enabled to be adjusted for an improved visibility to a user in relation to the display brightness.

It is an object of the present invention to automatically adjust the screen brightness of a display unit according to the display brightness, thereby improving the visibility of the screen to the user viewing the screen display.

It is a further object of the present invention to provide a method for displaying data in a window and controlling the screen brightness of the display unit according to a method for displaying data in the window as detected by the present invention.

According to one aspect of the present invention, the brightness controlling apparatus of the present invention includes an evaluator for detecting a feature of a certain window displayed on the screen of a display unit and a display controller for controlling the screen brightness of the display unit in relation to the feature of the certain window, as detected by the evaluator.

According to another aspect of the present invention, the brightness controlling apparatus can control the screen brightness of an integrated display, a connected display, or an external display unit connected to the apparatus via a cable, as well as the screen brightness of a display unit formed unitarily with the housing of the computer system just like a lap-top PC.

Operatively, the evaluator of the brightness controlling apparatus detects the type of the application software being used to display images in a window and the display controller controls the screen brightness of the display unit according to the type of the application software detected by the evaluator. As used herein, the term "image" is inclusive of but not limited to include images, text, graphics, pictoral representations, drawings, collages, assemblies of works, alphanumeric representations, and combinations of any of the foregoing.

The method of the present invention for displaying data in a window, to be detected by the evaluator may be, for example, a method for displaying data under the control of a CPU used by such application software as a word processor, a method for displaying data under the control of a bus master that does not use a CPU, which is used to play back a DVD motion picture, etc.

Furthermore, the evaluator calculates the display brightness in the window according to a draw signal issued to the window displayed on the screen of the display unit. The display controller controls the screen brightness of the display unit according to the display brightness in the window, as calculated by the evaluator.

In this brightness controlling apparatus, the evaluator detects a feature of a focused window on the screen, selected from the windows displayed on the screen of this display unit. The focused window may be, for example, a window ready to accept an input (active window) in a multi-window environment. The display controller sets the screen brightness of the display unit in case the rate of the size of the window whose feature is detected by the evaluator to the size of the screen of the display unit is over a certain value.

In another aspect of the present invention, a brightness adjusting system is provided for. The brightness adjusting system includes a display gradation calculating means for calculating the display brightness in a specific area of an image displayed on the screen of a display unit and brightness adjusting means for adjusting the screen brightness of the display unit according to the display brightness in the specific area, as calculated by the display gradation calculating means.

In addition to the display unit employed as an output device of a computer system, the display unit may also be a unit of any various display units such as TV sets, monitors, graphical display units, etc., including units that comprise other a plurality of displayable areas. In the latter situation, where a screen is divided into a plurality of areas so as to display data in each of those divided areas, the visibility can be improved by adjusting the screen brightness according to the display brightness in the specific area.

The display gradation calculating means calculates the display brightness in the specific area by converting the gradation of each RGB element in a draw signal of an image displayed in this specific area to a gray scale gradation.

Additionally, in another aspect of the present invention, a computer system having a processing means for executing an arithmetic operation and a display unit for displaying the result of the arithmetic operation executed by the processing means is provided for. The processing means detects the display brightness in a certain window displayed on the screen of the display unit and controls the display unit so as to change the screen brightness of the display unit according to the detected display brightness in the window such that the display unit changes the screen brightness under the control of the processing means.

The processing means is preferably controlled by an operating system that has a power management function and controls the display unit with use of the power management function of the operating system so as to change the screen brightness of the display unit.

In a further aspect, the present invention provides a liquid crystal display unit provided with a liquid crystal display screen for displaying an image, a back-light for lighting the liquid crystal display screen, and a brightness controller for controlling the brightness of the back-light. In the display unit, the brightness controller receives a brightness control signal generated according to the display brightness in the specific area, calculated from the draw signal of an image in the specific area, selected from the images displayed on the LCD screen so as to change the brightness of the back-light according to the brightness control signal.

In still a further aspect, the present invention provides a brightness controlling method for controlling the screen brightness of a display unit. The method comprises a step of calculating a brightness of the display in a certain window displayed on the screen of a display unit and a step of adjusting the whole screen brightness of the display unit according to the calculated display brightness.

The brightness controlling method may further include a step of monitoring the state of each window displayed on the screen of the display unit so as to detect a focused window on the screen, and the step of calculating the display brightness may further include a step of calculating the display brightness of the detected focused window. Furthermore, the step of calculating the display brightness may include a step of obtaining gradation information of each RGB element in a color displayed in a window and a step of converting the gradation of each obtained RGB element to a gray scale gradation so as to decide the converted gradation as the display brightness in the window.

In a further aspect, the present invention provides a computer software means for enabling processing of a computer to execute, or a storage medium for storing the computer software. The computer software enables the computer to calculate the display brightness in a certain window displayed on the screen of a display unit and control the display unit so as to change the screen brightness of the display unit according to the calculated display brightness.

In a further aspect, the processing means for controlling the display unit so as to change the screen brightness of the display unit may use the power management function of an operating system or an independent power source.

BRIEF DESCRIPTION OF THE DRAWINGS

Other aspects, features, and advantages of the present invention will become more fully apparent from the following detailed description, the appended claims, and the accompanying drawings in which:

FIG. 1 is an overall block diagram of a brightness adjusting system in the embodiment of the present invention;

FIG. 2 shows a relationship between the display brightness of a display unit and the screen brightness set by a display controller;

FIG. 3 is another relationship between the display brightness of the display unit and the screen brightness set by the display controller;

FIG. 5 shows how a text is displayed in a certain window;

FIG. 6 shows how a motion picture is played back in the certain window;

FIG. 7 is an architecture of a computer system with the Windows® 2000 installed as an OS with respect to a function for displaying data on the display unit screen;

FIG. 8 is a configuration of a brightness adjusting system in the embodiment of the present invention, realized as the computer system shown in FIG. 7;

FIG. 9 is another configuration of the brightness adjusting system in the embodiment of the present invention, realized as the computer system shown in FIG. 7; and FIG. 10 is still another configuration of the brightness adjusting system in an embodiment of the present invention.

DETAILED DESCRIPTION

Figure 4:
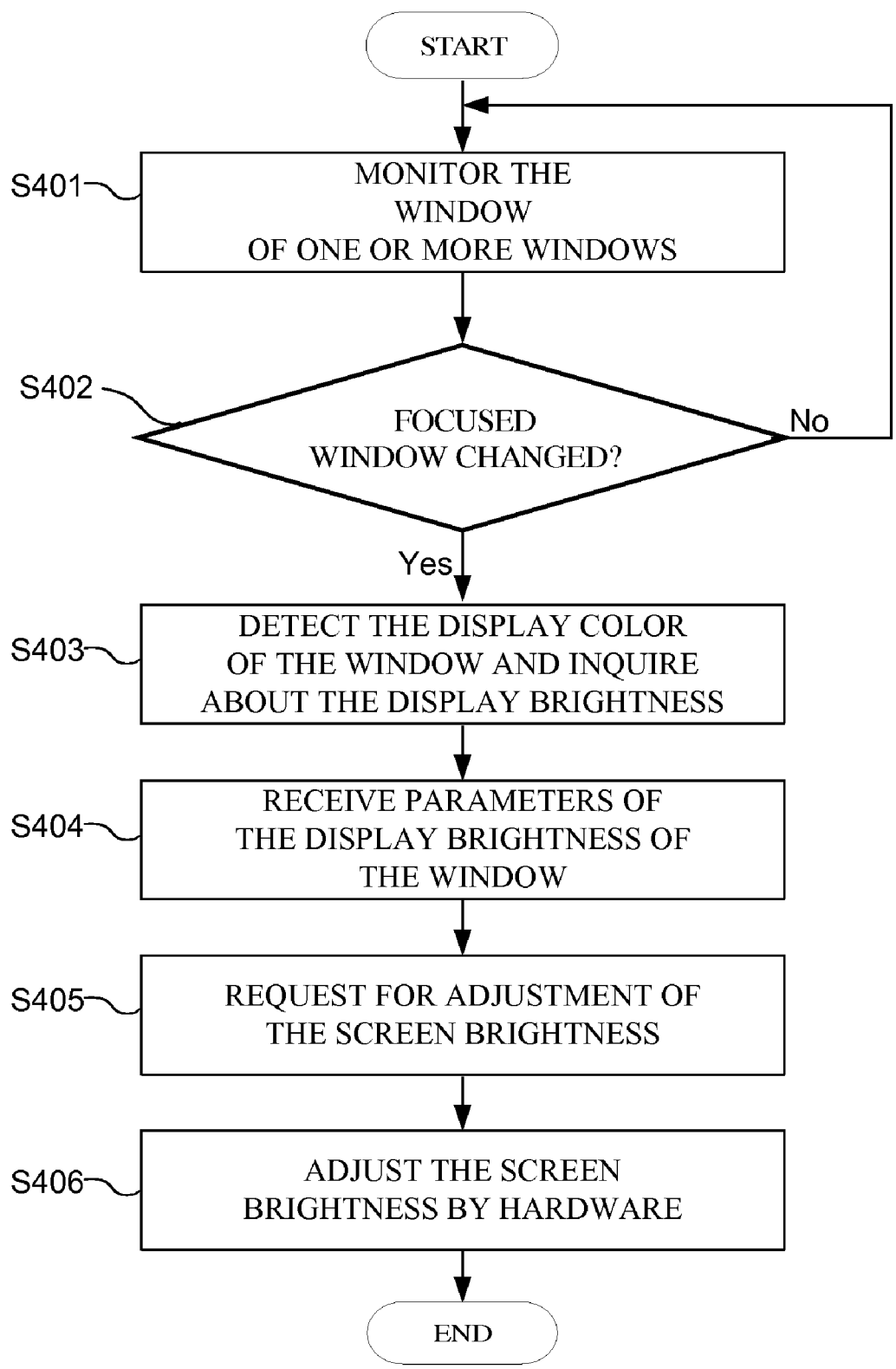
FIG. 4 is a flowchart for describing the operation of the embodiment of the present invention.

Hereinafter, the preferred embodiments of the present invention will be described with reference to the accompanying drawings.

The present invention monitors the draw signal of each image displayed on the screen of a display unit so as to adjust the screen brightness according to the display brightness in a predetermined area on the screen. More specifically, the display brightness is changed according to the color of each displayed image (hereinafter, to be referred to as the display color). Consequently, the present invention determines the display brightness by converting a display color in the predetermined area to a gray scale value and adjusts the screen brightness of the display unit itself (e.g., the brightness of the back-light of an LCD) according to the obtained display brightness, so as to improve the visibility of the screen to a viewing user.

The predetermined area of which display brightness is evaluated may be the present focused window (active window) in the display unit of a computer controlled by an operating system (hereinafter, to be referred to as the OS) corresponding to, for example, a multi-window environment. More specifically, the screen brightness of the display unit is adjusted according to each display color in the focused window. FIG. 1 is an overall block diagram of a brightness adjusting system in a first preferred embodiment. According to this preferred embodiment, the brightness adjusting system shown in FIG. 1 is installed in a computer and it controls the brightness of display means.

In FIG. 1, reference numeral 10 denotes a window manager, which manages the windows to be displayed in the multi-window environment supported by the OS. The window manager also detects a focused window. Reference numeral 20 denotes a gray scale gradation evaluator, which converts each RGB element displayed in the focused window to a gray scale value so as to find the brightness of the display color. Reference numeral 30 denotes a display controller, which sets screen brightness of the display unit. Reference numeral 40 denotes a brightness controller, which controls the screen brightness of the display unit according to the set value of the display controller 30.

In the above-described configuration, the window manager 10 is realized by, for example, software-controlled CPU and RAM, as well as another memory. The window manager 10 obtains a draw signal for drawing on the display unit screen so as to manage the state of each window displayed on the screen under the control of the OS. Concretely, the window manager 10 detects a focused window and manages such information as the size and display colors of each window. When a certain window is focused, the window manager 10 inquires of the gray scale gradation evaluator 20 about the display brightness of the window. The function of the window manager 10 is supplied as, for example, a function of the OS.

The gray scale gradation evaluator 20 is realized by, for example, software-controlled CPU and RAM, as well as another memory. The evaluator 20 evaluates the display brightness in the focused window according to the draw signal of the focused window in response to an inquiry from the window manager 10. This display brightness evaluation can be done according to the standard, which is window gradation information calculated according to the gradation information of a pixel group corresponding to the whole or part of the window. Concretely, each display color in the window is recognized as a gradation value of each RGB element and the gradation value is converted to a gray scale value so as to find a gray scale gradation of the window. In the gray scale, both hue and saturation of the display color are lost and only the brightness remains. Consequently, the display brightness in the window can be found by converting each display color in the window to a gray scale value so as to find the gradation.

In another preferred embodiment, a display unit displays data in a color wherein the displayed color is configured by RGB (i.e., a combination of red (R), green (G) and blue (B) pixels). Consequently, the gradation per pixel, in the most simple example, is obtained by dividing the sum of color gradations by 3. More specifically, the present invention performs the following calculation:

Gradation per pixel=(red gradation+green gradation+blue gradation)/3

Additionally, the gray scale-gradation in a certain window is obtained by dividing the sum of gradations per pixel by the number of pixels. More specifically, the present invention performs the following calculation:

Gray scale gradation=Σ(gradation per pixel)/number of pixels

Additionally, where the gradation per pixel is to be calculated, the above expression may also be corrected by taking the hue, the color of the display unit screen panel itself, etc. into consideration. In such a case, a proper parameter is set for each RGB element. More specifically, in case parameters p1, p2, and p3 are set for red, green, and blue respectively, the gradation per pixel is calculated as follows.

Gradation per pixel=(p1×red gradation+p2×green gradation+p3×blue gradation), where it is assumed that p1+p2+p3=1.

The gray scale gradation in a focused window, calculated by the gray scale gradation evaluator 20 as described above, is sent to the window manager 10 as parameters denoting the display brightness of the focused window. When the window display is bright, high parameter values are sent and when the window display is dark, low parameter values are sent. Receiving parameters from the gray scale gradation evaluator 20, the window manager 10 sends those parameters to the display controller 30.

The display controller 30 is realized by, for example, software-controlled CPU and RAM, as well as another memory. The display controller 30 sets the screen brightness for the display unit according to the parameters of the display brightness in the focused window received from the window manager 10. Concretely, the display controller 30 decreases the screen brightness in case the parameter values are high (bright display) and increases the screen brightness in case the parameter values are low (dark display).

FIG. 2 illustrates a relationship between the display brightness of the display unit and the screen brightness set by the display controller 30. In FIG. 2, the vertical axis denotes the screen brightness and the horizontal axis denotes the display brightness of the display unit. The dotted line denotes a relationship between the screen brightness and the display brightness when the brightness is not adjusted (fixed) and the solid line denotes a relationship between the screen brightness and the display brightness when the brightness is adjusted according to the values set by the display controller 30. In reference to FIG. 2, it will be understood that the screen brightness is lowered in steps as the display brightness is increased. And, the more the display brightness is increased, the more the brightness is lowered.

FIG. 3 illustrates another example for denoting the relationship between the display brightness of the display unit and the screen brightness set by the display controller 30. In reference to FIG. 3, it will be understood that the screen brightness is getting low as the display brightness is increased and the more the display brightness is increased, the more the brightness is lowered just like in FIG. 2. Additionally, as is apparent from FIG. 3, that the more the display brightness is lowered, the more the brightness is increased.

As described above, various relationships can be taken for between the display brightness of the display unit and the screen brightness set by the display controller 30 in case the screen brightness is lowered as the display brightness is increased and increased as the display brightness is decreased (to go low to the right in FIGS. 2 and 3). Actually, however, the relationship should preferably be set according to the display unit type (LCD, CRT display, etc.), the display characteristics, etc.

The brightness controlling apparatus 40 is a hardware component for controlling the actual screen brightness by controlling the operation power of the display unit. The controlling apparatus 40 increases/decreases the screen brightness under the control of the display controller 30. When the display unit is an LCD, the brightness controlling apparatus 40 adjusts the brightness by controlling the power to the back-light.

FIG. 4 is a flowchart for describing the operation of the brightness adjusting system in this embodiment.

In FIG. 4, the window manager 10 obtains a draw signal issued to the display unit screen in its initial state so as to monitor each window displayed on the screen (step 401). In case the focused window is changed to another, the window manager 10 detects the display color of the window and inquires of the gray scale gradation evaluator 20 about the display brightness of the window (steps 402 and 403). Were the focused window changed to another, control thereby goes to processings in and after step 402. The window manager 10 may also start the processings in and after step 403 in case it detects an operation predetermined by the user. The user predetermined operation may be booting, suspend resuming, Windows® 2000®trademark of Microsoft Corp., USA) display device switching, etc.

Next, the window manager 10 requests the display controller 30 to adjust the screen brightness of the display unit as needed according to the parameters of the display brightness of the focused window (steps 404 and 405). The parameters are returned from the gray scale gradation evaluator 20. In response to the request, the display controller 30 controls the brightness controlling apparatus 40 so as to adjust the screen brightness of the display unit (step 406).

In this particular embodiment, the screen brightness is adjusted according to the display brightness in a specific area, which is the focused window selected from the windows displayed on the screen of the display unit as described above, thereby controlling the display brightness on the whole screen.

FIG. 5 illustrates how a text is displayed by the Acrobat Reader™ of Adobe Inc., USA. As shown in FIG. 5, were text and data can be entered, edited, and displayed, the background is often displayed in white. Consequently, the window display becomes bright. In case the window is focused, therefore, the screen brightness of the display unit is lowered so as to darken the display of the whole screen for easier recognition of the display.

FIG. 6 illustrates how motion picture playback software plays back a motion picture. The motion picture is displayed in monochrome in FIG. 6. Generally, however, many colors are used to display such a motion picture, so the window display becomes comparatively dark. (In FIG. 6, the motion picture is displayed in monochrome, so the display is apparently darker than in FIG. 5.) In case the window is focused, therefore, the screen brightness of the display unit is increased so as to make the whole screen display brighter for easier recognition.

While the window manager 10 decides whether to adjust the screen brightness of the display unit according to only the display brightness of the focused window in the above embodiment, the size of the focused window may also be taken into consideration for the decision. Concretely, in case the rate of the focused window size to the display unit screen size is over a certain value (e.g., ¼ of the whole screen or over), the screen brightness is adjusted. This is because changes of the screen brightness are considered to be less effective for improving the visibility in case the focused window size is small.

Furthermore, in the above embodiment, the screen brightness is adjusted according to the display brightness in the window regardless of the software type displayed in the window. However, the screen brightness may also be adjusted according to the software type displayed in the window; there is no need to find the display brightness in the window in this case. Concretely, such software as word processor and spreadsheet software that generally uses a bright display window with a bright background is registered beforehand, so that the screen brightness can be adjusted immediately after the window in which the registered software is to run is focused. In this case, the window manager manages the types of the application software, thereby it can decide whether to need brightness adjustment by referring to this information.

Furthermore, the screen brightness can also be adjusted according to a method for displaying data on the display unit. Concretely, it is possible to control the display unit so that such data as a DVD motion picture is high-lighted when it is played back by the bus master without using the CPU and in other cases, data is low-lighted. In this case, the information held in the display driver and/or the graphic chip can be used to change the brightness.

Next, a description will be made for the brightness adjusting system in this embodiment. The system is realized as a computer system in which the Windows® 2000 (OS of Microsoft Corp., USA) is installed.

FIG. 7 is an architecture of a computer system, which is related to a function for displaying data on a display unit. The Windows® 2000 is installed in the computer system. The computer architecture shown in FIG. 7 uses an LCD as the display unit.

In FIG. 7, the window application in the application layer is already started up and it displays windows on the desk top.

The OS/device driver layer includes the Win32K, which is a kernel module; the GDI (Graphics Driver Interface) 32 and the DirectDraw for converting a command received from the window application to an instruction so as to be interpreted by a graphic processing device driver respectively; the I/O manager, which is an input/output control module; a power manager, which is a power source management/control module; an ACPI driver for controlling power saving on the basis of the ACPI (Advanced Configuration and Power Interface), and a display driver for controlling a graphic chip. The Win32K includes a window manager and a graphic engine (GDI). The BIOS layer includes the ACPI BIOS corresponding to the ACPI. The hardware layer includes a graphic chip for displaying images on the LCD screen and a back-light brightness controller, which is a logic circuit for controlling the back-light of the LCD. In the architecture shown in FIG. 7, a command issued by the window application is passed to the display driver via the GDI32, the DirectDraw, the Win32K etc. The display driver then controls the graphic chip according to the received command and displays a predetermined image on the LCD screen. On the other hand, in case the Win32K sends a control instruction to the ACPI driver via the power manager, the ACPI driver controls the back-light brightness controller via the ACPI BIOS so as to change the brightness of the LCD back-light.

FIG. 8 shows a configuration of a brightness adjusting system in this embodiment. The brightness adjusting system is realized as the computer system shown in FIG. 7.

In FIG. 8, the Win32K operates as the window controller 10 and the power manager operates as the display controller 30 in the OS/device driver layer. The OS/device driver layer is also provided newly with a white balance evaluation engine used as a module for realizing the function of the gray scale gradation evaluator 20. Furthermore, the back-light brightness controller operates as the brightness controlling apparatus 40 in this configuration.

More specifically, in case a certain window is focused by the user, the Win32K recognizes the window and the white balance evaluation engine finds the display brightness of the focused window. Then, the evaluation engine issues an LCD control instruction to the power manager. The power manager then sends a control signal to the back-light brightness controller via the ACPI driver and the ACPI BIOS. The back-light brightness controller thus adjusts the brightness of the LCD back-light.

FIG. 9 shows another configuration of the brightness adjusting system in this embodiment. The brightness adjusting system is realized as the computer system shown in FIG. 7.

In FIG. 9, the graphic chip operates as the window controller 10, the gray scale gradation evaluator 20, and the display controller 30. And, the back-light brightness controller operates as the brightness controlling apparatus 40.

More specifically, in case a certain window is focused by the user while the desk top state is held in the video buffer (memory) of the graphic chip, the state change of the desk top is detected, the display brightness of the window is evaluated, and then a control signal is sent to the back-light brightness controller according to the evaluated display brightness. Then, the back-light brightness controller adjusts the brightness of the LCD back-light.

FIG. 10 shows still another configuration of the brightness adjusting system in this embodiment. The brightness adjusting system is also realized as the computer system shown in FIG. 7.

In FIG. 9, a filter driver is newly added as a module for realizing the functions of the window controller 10, the gray scale gradation evaluator 20, and the display controller 30. And, the back-light brightness controller operates as the brightness controlling apparatus 40.

The filter driver obtains a draw signal to be sent from the Win32K to the display driver so as to check the state of the desk top. In case a certain window is focused by the user, the filter driver detects the state change of the desk top and evaluates the display brightness of the focused window, then sends a control signal to the back-light brightness controller according to the evaluated brightness. The back-light brightness controller thus adjusts the brightness of the LCD back-light.

While a description has been made for a brightness adjusting system to be realized as a computer system with Windows® 2000 installed therein as an OS in this embodiment, the present invention does not limit the brightness adjusting system only to the embodiment, of course. Especially, in case the brightness of the display unit is adjusted without using any existing function of the OS as described with reference to FIGS. 9 and 10, it is easy to combine various operating systems (OS) to adjust the brightness.

While the screen brightness of the display unit of the computer system is adjusted according to the display brightness of a focused window in a multi-window environment in the above embodiment, the present invention is not limited only to that; because it is already known well that the brightness of such display means as a CRT, a plasma display, etc. can be changed under the control of the computer system body, the technique for adjusting the screen brightness according to the present invention can also be used for any display unit employed as other various display means. For example, some TV sets can divide the screen into a plurality areas so as to display a plurality of software in those areas simultaneously. In such a case, a focused display area is selected from those display areas corresponding to a software respectively and the display brightness in the display area is found, thereby adjusting the screen brightness to decide the appropriate brightness for the display area.

In this case, the focused display area may be a display area having the largest dedicated area on the screen and a display area in which an image corresponding to an output voice is displayed.

As described above, according to the present invention, the screen brightness of a display unit can be adjusted automatically according to the display brightness so as to improve the visibility of the display screen.

What is claimed is:

1. A computer-readable medium containing programming instructions for controlling brightness from a display unit, the programming instructions comprising:
    calculating a display brightness within a specific first window of a one or more windows displayed on a screen of said display unit; and
    controlling said display unit so as to change a screen brightness of the whole screen according to said calculated display brightness within said specific first window, wherein the controlling comprises lowering the brightness of the whole screen as the brightness within the specific first window increases.

2. The computer-readable medium of claim 1, the programming instructions further comprising:
    using a power management function for controlling said display unit so as to change said screen brightness of said display unit.

3. The computer-readable medium of claim 1, the programming instructions further comprising:
    detecting the specific first window; and
    requesting the brightness within the specific first window from a gray scale gradation evaluator.

4. The computer-readable medium of claim 1, the programming instructions further comprising:
    calculating the display brightness within a specific first window, converting a gradation a pixel group corresponding to the whole or part of the first window to a gray scale value.

5. A computer-readable medium containing programming instructions for controlling brightness from a display unit, the programming instructions comprising:
    calculating a display brightness within a specific first window of a one or more windows displayed on a screen of said display unit; and
    controlling said display unit so as to change a screen brightness of the whole screen according to said calculated display brightness within said specific first window, wherein the controlling comprises raising the brightness of the whole screen as the brightness within the specific first window decreases.

6. A method for controlling brightness from a display unit comprising:
    calculating a display brightness within a specific first window of a one or more windows displayed on a screen of said display unit; and
    controlling said display unit so as to change a screen brightness of the whole screen according to said calculated display brightness within said specific first window, wherein the controlling comprises lowering the brightness of the whole screen as the brightness within the specific first window increases.

7. The method of claim 6 further comprising:
    using a power management function for controlling said display unit so as to change said screen brightness of said display unit.

8. The method of claim 6 further comprising:
    detecting the specific first window; and
    requesting the brightness within the specific first window from a gray scale gradation evaluator.

9. The method of claim 6 further comprising:
    calculating the display brightness within a specific first window, converting a gradation a pixel group corresponding to the whole or part of the first window to a gray scale value.

10. A method for controlling brightness from a display unit comprising:
    calculating a display brightness within a specific first window of a one or more windows displayed on a screen of said display unit; and
    controlling said display unit so as to change a screen brightness of the whole screen according to said calculated display brightness within said specific first window, wherein the controlling comprises raising the brightness of the whole screen as the brightness within the specific first window decreases.

* * * * *